Jan. 9, 1945. O. A. RAMEY 2,366,804
DAYLIGHT PHOTOGRAPHIC NUMBERING MACHINE
Filed Sept. 18, 1942 3 Sheets-Sheet 1
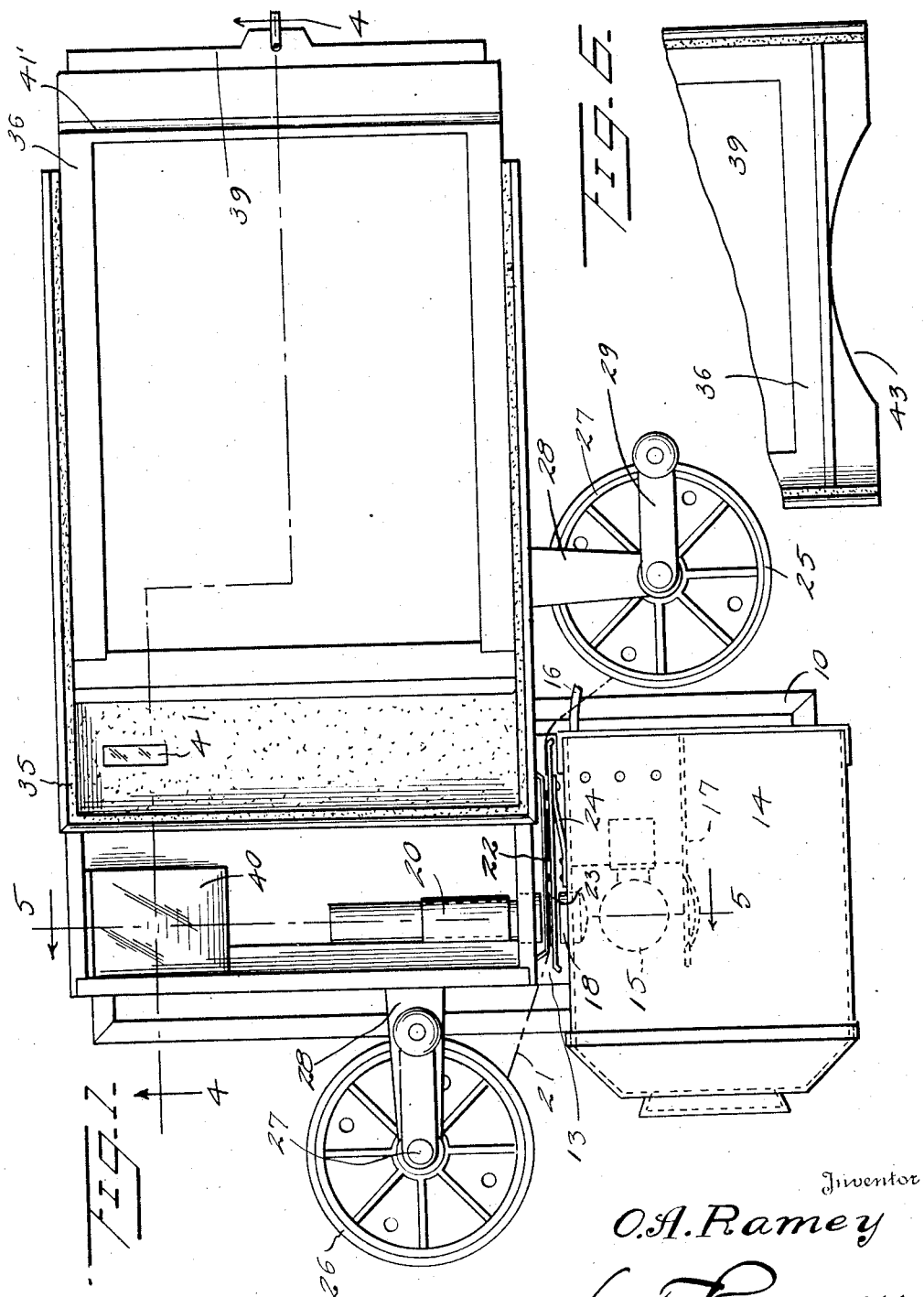
Inventor
O. A. Ramey
By L. F. Randolph
Attorney

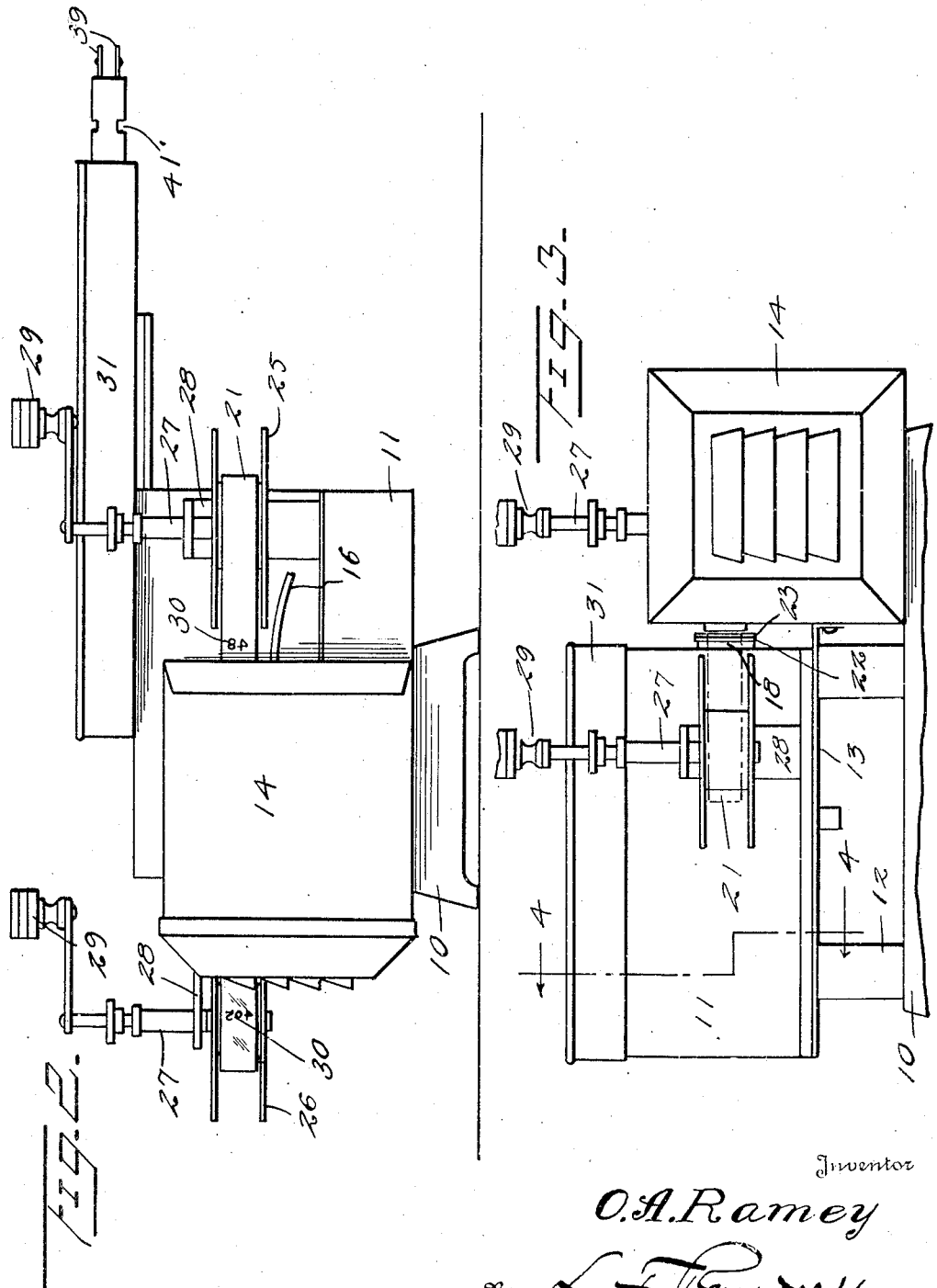

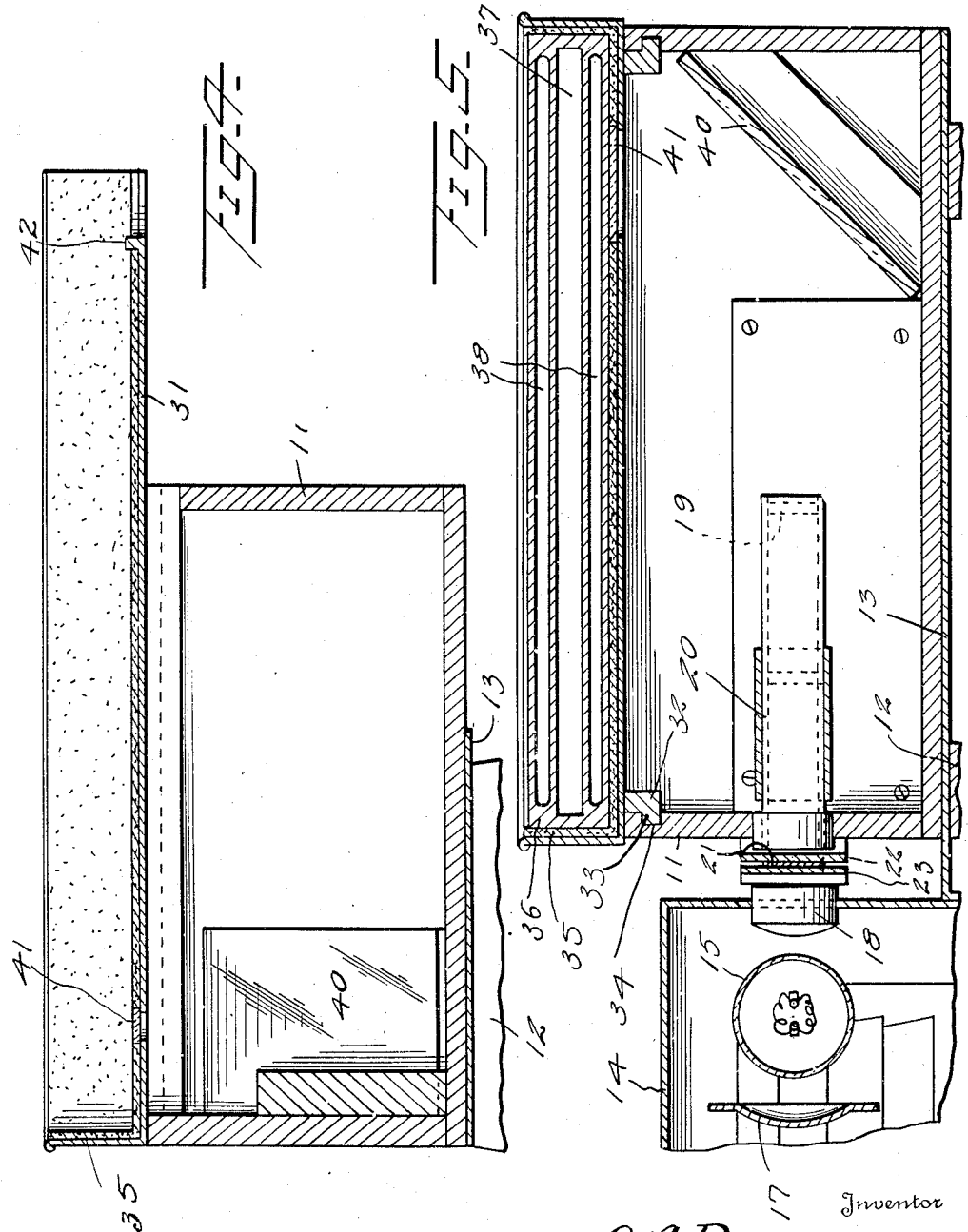

Patented Jan. 9, 1945

2,366,804

UNITED STATES PATENT OFFICE 2,366,804

DAYLIGHT PHOTOGRAPHIC NUMBERING MACHINE

Oscar A. Ramey, Oakland, Calif.

Application September 18, 1942, Serial No. 458,838

4 Claims. (Cl. 95—1.1)

This invention relates to a machine whereby photographic negatives may be numbered in daylight and without resort to the usual dark room.

It is especially aimed to provide a machine or mechanism which will expeditiously number a large quantity of the negatives and which is especially adapted for professional use and for instance in the army and navy signal corps even on the field of operation.

I also aim to provide a structure which is portable, compact, inexpensive and one which may be operated by powerhouse current or from a dry cell or other batteries, as preferred.

The more specific objects and advantages will become apparent from a consideration of the description following taken in connection with the accompanying drawings illustrating an operative embodiment.

In said drawings—

Figure 1 is a plan view of the apparatus with the tray, holder partly extended in disclosed detail;

Figure 2 is a side elevation of the parts of Figure 1;

Figure 3 is an end elevation looking from the left in Figure 2;

Figure 4 is a longitudinal sectional view taken on the line 4—4 of Figure 1;

Figure 5 is a sectional view taken on the line 5—5 of Figure 1 and

Figure 6 is a fragmentary plan view of the film or plate holder.

Referring specifically to the drawings wherein like reference characters designate like or similar parts, I provide a suitable supporting base at 10 upon which a main box 11 is suitably mounted as on blocks 12, with one or more metallic brackets 13 interposed.

Fastened to the bracket 13 one side of the main box 11 and resting directly on the base 10 is a suitable lamp housing 14.

Said housing 14 has a suitable electric lamp 15 mounted therein adapted for energization a conventional plugging in or connection of a cord 16 with a source of powerhouse electricity or with dry batteries, storage batteries or the like, as preferred. Behind the lamp 15 is a reflector 17. Light from the lamp 15 is projected through a tube or lens 18 on the housing 14 and through an alined condensing lens structure 19 carried by tube mechanism 20 of conventional form as used in cameras and mounted in the main box 11.

The light from lamp 15 also projects through a flexible indicia film at 21 which passes across the line of projection and between film guides at 22 and 23, suitably apertured for passage of the light therethrough. Guide 22 is preferably stationary and attached to the outside of the main box 11 while guide 23 is mounted by a spring 24 fastened to it and to the box 14, and tension for movement toward the guide 22 in order to press the film flat against and between both guides, at proper tension. Film 21 is transparent and it has numbers preferably consecutively, photographed or delineated thereon and the numbers as viewed by the light from the lamp 15 read backwards and upside down so that they will read correctly on negatives. In the case of salesmen taking a multiplicity of photographs, the numbers on the film 21 correspond to the numbers on the negatives produced by such salesmen.

Film 21 may be operated in any suitable manner, for instance having its opposite ends trained over reels 25 and 26, carried by shaft 27, journaled in brackets or bearings 28 suitably fastened to the main box 11 and which shafts 27 are equipped with manually operable cranks at 29. The numbers on the film 21 are shown at 30.

The main box 11 is closed at all walls except the top and in photographing the numbers on to negatives, such top is also adapted to be closed by a slidable tray structure 31. Such tray structure 31, carries depending L-shaped runners 32 whose extensions 33 are slidably engaged in opposed grooves 34 in the inner surfaces of the side walls of main box 11. The interior of the tray, especially at the side, and the rear end, is lined with felt as at 35.

Slidably and removably disposed in the tray 31 is a film or plate holder 36, generally in the form of an open rectangular plane. Such holder 36 has a space at 37 which removably mount the negative film or negative plate and it also has spaces at 38 which removably accommodate a slidable dark slide 39.

When a number at 30 is being photographed from the film 21 onto a negative within the chamber, space or groove 37, the same is projected with the aid of lamp 15, onto an inclined mirror 40 within the main box 11. At such time, the tray is in a position completely enclosing and rendering the interior of the main box 11 dark. The mirror 40 reflects the image or number upwardly through a clear glass or lens at 41 mounted in the bottom wall of the tray 31. The picture being taken through the operation of the negative and dark slide or slides in the manner well known in photography regardless of whether or not superpanchromatic films, or ones which are non-sensitive or slower, are used.

In starting operation, in order to check the numbers 30, or otherwise, a ground glass may be held beneath the clear glass or lens 41 temporarily.

Also, to facilitate the withdrawal of the dark slide without destroying the film or plate holder 36, the latter is preferably equipped with notches at 41' which are engageable with strips or ridges 42 disposed across the bottom of the tray.

Also, in order to enable the operator to better grasp the dark slide, film or plate holder 36, is cut away as at 43.

It will thus be seen that in applying the numbers or any equivalent indicia to the negatives, that the same may be done in the daytime or in daylight, without resort to a dark room and in fact may be done at the scene of photographing, as on the battle field, or when photographing schools or organizations away from the studio.

Various changes may be resorted to provided they fall within the spirit and scope of the invention.

I claim as my invention:

1. Apparatus for photographing indicia on to negatives comprising a box, mean slidable over the box having an opening therethrough to register with a part of a negative, and means for the projection of light through the box and said opening onto the negative for photographing purposes, the second-mentioned means comprising a housing located at one corner of the box and mounted thereon with a space between the same and the box, a tray forming part of said first means adapted to close the box to render it dark, said opening being in said tray and having a glass thereover, and a holder carried by the tray for negatives in combination with dark slide means and means to mount an indicia film for passage through said space.

2. Apparatus for photographing indicia on to negatives comprising a box, means slidable over the box having an opening therethrough to register with a part of a negative, and means for the projection of light through the box and said opening onto the negative for protographing purposes, the second-mentioned means comprising a housing located at one corner of the box and mounted thereon with a space between the same and the box, a tray forming part of said first means adapted to close the box to render it dark, said opening being in said tray and having a glass thereover, and a holder carried by the tray for negatives in combination with dark slide means, and means to mount an indicia film for passage through said space, and an interfitting means between the holder and tray to maintain the tray relatively stationary to facilitate removal of the slide means.

3. Apparatus for photographing indicia on to negatives comprising a box, means slidable over the box having an opening therethrough to register with a part of a negative, and means for the projection of light through the box and said opening onto the negative for photographing purposes, the second-mentioned means comprising a housing located at one corner of the box and mounted thereon with a space between the same and the box, a tray forming part of said first means adapted to close the box to render it dark, said opening being in said tray and having a glass thereover, and a holder carried by the tray for negatives in combination with dark slide means, an interfitting means between the holder and tray to maintain the tray relatively stationary to facilitate removal of the slide means, the said box having lens-tube means, a mirror in said box to reflect images from the lens tube means through said glass, means to project light through the lens-tube means, and means in said space to be traversed by the indicia film located between the illuminating means and the lens-tube means.

4. Apparatus for photographing indicia on to negatives comprising a box, means slidable over the box having an opening therethrough to register with a part of a negative, and means for the projection of light through the box and said opening onto the negative for photographing purposes, the second-mentioned means comprising a housing located at one corner of the box and mounted thereon with a space between the same and the box, a tray forming part of said first means adapted to close the box to render it dark, said opening being in said tray and having a glass thereover, and a holder carried by the tray for negatives in combination with dark slide means, an interfitting means between the holder and tray to maintain the tray relatively stationary to facilitate removal of the slide means, and said box having lens-tube means, a mirror in said box to reflect images from the lens tube means through said glass, means to project light through the lens-tube means, and means in said space to be traversed by the indicia film located between the illuminating means and the lens-tube means, comprising guides, one of said guides being movable relatively to each other to grasp the film a box mounting the illuminating means, reels mounted on the first mentioned box and traversed by the film, and supporting means for the boxes.

OSCAR A. RAMEY.